(12) United States Patent
They

(10) Patent No.: US 11,702,201 B2
(45) Date of Patent: Jul. 18, 2023

(54) AMPHIBIOUS AIRCRAFT TAXIING SYSTEMS

(71) Applicant: They, Galveston, TX (US)

(72) Inventor: They, Galveston, TX (US)

(*) Notice: Subject to any disclaimer, the term of this patent is extended or adjusted under 35 U.S.C. 154(b) by 428 days.

(21) Appl. No.: 16/905,311

(22) Filed: Jun. 18, 2020

(65) Prior Publication Data
US 2021/0394900 A1    Dec. 23, 2021

(51) Int. Cl.
*B64C 35/00* (2006.01)
*B64C 25/54* (2006.01)
*B60F 5/00* (2006.01)
*G05D 1/00* (2006.01)
*B64D 27/24* (2006.01)
*B64D 29/06* (2006.01)

(52) U.S. Cl.
CPC ............ *B64C 35/005* (2013.01); *B60F 5/003* (2013.01); *B64C 25/54* (2013.01); *B64C 35/008* (2013.01); *B64D 27/24* (2013.01); *B64D 29/06* (2013.01); *G05D 1/0016* (2013.01)

(58) Field of Classification Search
CPC ..... B64C 25/54; B64C 35/005; B64C 35/008; B63H 11/02; B63H 11/101; B63H 11/107; B63H 11/08
See application file for complete search history.

(56) References Cited

U.S. PATENT DOCUMENTS

| | | | |
|---|---|---|---|
| 2003/0056704 A1* | 3/2003 | Ishigaki ............... | B63H 11/107 114/38 |
| 2010/0032522 A1* | 2/2010 | Zadini .................... | B63H 25/46 244/105 |
| 2017/0341725 A1* | 11/2017 | Skahan .................. | B64C 25/54 |

* cited by examiner

*Primary Examiner* — Nicholas McFall
(74) *Attorney, Agent, or Firm* — Benjamin Aaron Adler

(57) ABSTRACT

Provided is a taxiing system for steering an amphibious aircraft on a body of water with a steering means, a control console and a power source all in operable and electrical communication. The steering means is a jet drive coupled to an impeller assembly mounted inside each float. Alternatively the steering means is a propulsion system with a pair of tunnel-type thrusters mounted inside the floats in the aircraft. The control console operates the taxiing system during steering and at least one electromagnetic lock during docking.

3 Claims, 14 Drawing Sheets

AMPHIBIOUS AIRCRAFT TAXIING SYSTEMS

BACKGROUND OF THE INVENTION

Field of the Invention

The present invention is in the field of aircraft control systems. More specifically, the present invention is directed to systems and devices for amphibious aircraft taxiing and docking control.

Description of the Related Art

Amphibious aircrafts have a distinct advantage over land-based planes in availability of landing sites and their ability to operate from remote locations. However, a basic understanding of fluid dynamics and the interaction of a plane operating in that environment brings to light some very real and hazardous situations that a pilot must acknowledge and overcome. One of the primary and consistently prevalent problems is low-speed taxi maneuvering. A survey (F.A.A. Accident Survey 1992 Doc #1825.23) concluded that over 87% of amphibious accidents occurred while taxiing in close proximity to obstructions such as docks, fueling stations, other planes. Such accidents increase the risk to life and property damage that can cost over three million dollars.

In general, the slower the velocity of an object moving through the water, the less the resistance offered. At slow speeds, even a draft of wind can send the plane moving in an uncontrolled direction with potentially disastrous results. Thus, for a plane moving slowly in taxi, a compromise must be made by moving fast enough to be able to steer the plane, (loss of "steerageway") but not collide with the intended destination. Such precise control is complicated by aircraft design, which makes it difficult to apply existing methods uniformly for all aircraft.

Overall, there is a deficiency in the art for optimal maneuvering systems for amphibious aircraft. Thus, there is a recognized need for improved systems and devices for assisting amphibious aircraft during taxiing and docking. The present invention fulfills this longstanding need and desire in the art.

SUMMARY OF THE INVENTION

The present invention is directed to a taxiing system for steering an amphibious aircraft on a body of water. The taxiing system comprises a means for steering the aircraft on the body of water, a control console and a power source. The control console is in operable communication with the means for steering and the power source is in electrical communication with the means for steering and the control console.

The present invention also is directed to a system for maneuvering an amphibious aircraft on a body of water. The maneuvering system comprises a propulsion system for steering the amphibious aircraft on the body of water, at least one electromagnetic lock, a control console in operable communication with the propulsion system and a power source. The electromagnetic lock is attached to a float on the amphibious aircraft to lock and unlock with a docking ring. The control console is in operable communication with the propulsion system and the electromagnetic lock and the power source is in electrical communication with the propulsion system, the electromagnetic lock and the control console.

Other and further aspects, features, benefits, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIG. 1A shows one configuration of the control console. FIG. 1B shows a second configuration of the control console. FIG. 1C shows one configuration of the remote control. FIG. 1D shows a second configuration for the remote control. FIG. 1E shows the remote control removably secured within the control console.

FIG. 2A is a side view of a mooring buoy with a mooring ring disposed circumferentially. FIG. 2B is a top view of a mooring buoy showing the mooring ring disposed circumferentially. FIG. 2C a side view of a mooring buoy with a mooring ring to which is removably docked an amphibious aircraft.

FIG. 3A illustrates using a system comprising the taxiing system and the docking device to secure the aircraft to a mooring buoy. FIG. 3B illustrates using the taxiing system to steer the aircraft before manually securing it to a dock.

FIG. 10A shows a cross sectional top view of the thruster tunnel. FIG. 10B shows a cross sectional front side view of the thruster tunnel.

DETAILED DESCRIPTION OF THE INVENTION

Figure 1A:
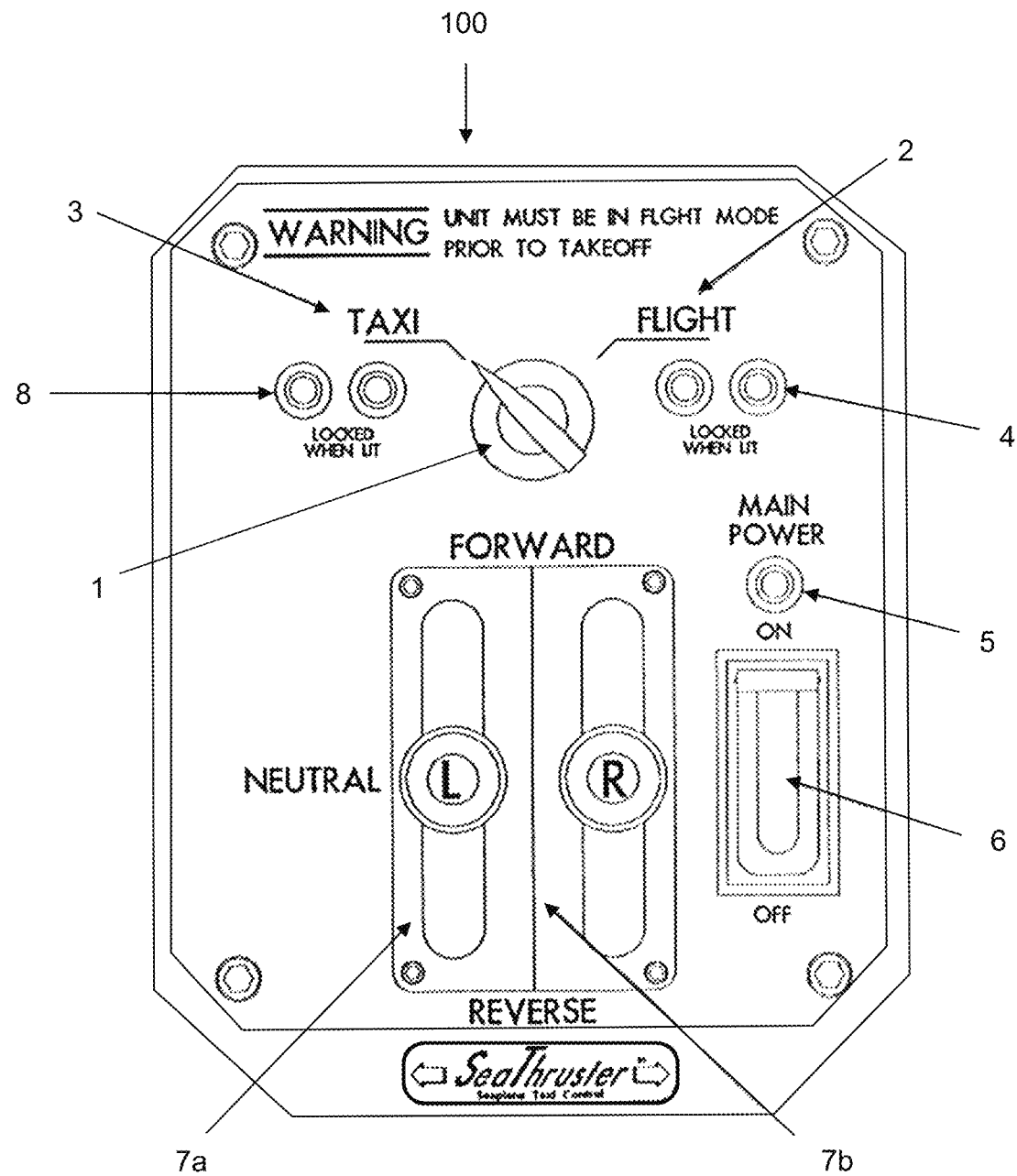
FIGS. 1A-1E show the control console and remote for the amphibious aircraft taxiing and auto-dock mooring system.

For convenience, before further description of the present invention, certain terms employed in the specification, examples and appended claims are collected herein. These definitions should be read in light of the remainder of the disclosure and understood as by a person of skill in the art. Unless defined otherwise, all technical and scientific terms used herein have the same meaning as commonly understood by a person of ordinary skill in the art.

The articles "a" and "an" when used in conjunction with the term "comprising" in the claims and/or the specification, may refer to "one", but is also consistent with the meaning of "one or more", "at least one", and "one or more than one". Some embodiments of the invention may consist of or consist essentially of one or more elements, components, method steps, and/or methods of the invention. It is contemplated that any composition, component or method described herein can be implemented with respect to any other composition, component or method described herein.

The term "or" in the claims refers to "and/or" unless explicitly indicated to refer to alternatives only or the alternatives are mutually exclusive, although the disclosure supports a definition that refers to only alternatives and "and/or".

The terms "comprise" and "comprising" are used in the inclusive, open sense, meaning that additional elements may be included.

The term "including" is used herein to mean "including, but not limited to". "Including" and "including but not limited to" are used interchangeably.

The term "pod" is used herein to mean, a self-contained unit comprising various structural and functional elements that is installed on an aircraft.

As used herein, the terms "forward" and "reverse" in reference to the taxiing system disclosed herein refer to those components, features, parts and aspects thereof that steer or propel the amphibious aircraft in a forward or reverse direction.

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure. For example, a thrust of 22 pounds to 83 pounds is encompassed by about 25 pounds to about 75 pounds.

In one embodiment of the present invention there is provided a taxiing system for steering an amphibious aircraft on a body of water comprising means for steering the amphibious aircraft on the body of water; a control console in operable communication with the means for steering; and a power source in electrical communication with means for steering and the control console.

Further to this embodiment the taxiing system comprises at least one electromechanical lock attached to at least one float on the amphibious aircraft configured to lock and to unlock with a docking ring. In this further embodiment the electromechanical lock may be configured for actuation by a docking button disposed on the remote control to lock and unlock the electromechanical lock with the docking ring.

In one aspect of both embodiments the means for steering is a jet drive propulsion system comprising a pair or jet drives, each jet drive comprising a waterproof drive motor with a shaft disposed axially therethrough; and an impeller assembly with an impeller intake port, a tunnel opening configured to receive the shaft therein, and an impeller discharge port at an axially opposing end to the tunnel opening, said impeller assembly comprising an impeller operably attached to the shaft; an intake duct with a first intake end and a second intake end, where the first intake end is attached to and in fluid communication with the intake port in the impeller assembly; an intake port disposed at the second intake end and in fluid communication therewith; and a forward thruster duct with a first forward duct end and a second forward duct end; a forward thruster nozzle with a first forward nozzle end and a second forward nozzle end in fluid communication with the second forward duct end and the body of water, respectively; a reverse thruster duct with a first reverse duct end and a second reverse duct end; a reverse thruster nozzle with a first reverse nozzle end and a second reverse nozzle end in fluid communication with the second reverse duct end and the body of water, respectively; and a solenoid valve in electrical communication with the control console and in fluid communication with the impeller discharge port and with the first forward duct end and the first reverse thruster duct end.

In this aspect each of the jet drives may be removably mounted onto an outer surface of a float on the amphibious aircraft. Also in this aspect each of the jet drives may be mounted onto an inner surface of a float on the amphibious aircraft, where the float comprises a plurality of openings each with a diameter equal to outer diameters of the intake duct, the forward thruster nozzle and the reverse thruster nozzle, respectively. In addition each jet drive may be mounted on an inboard side at a front end of a float.

In another aspect of both embodiments the means for steering is a tunnel-type thruster propulsion system comprising a pair of tunnel-type thrusters each comprising a reversible drive motor with a shaft disposed axially therethrough; a forward-reverse control switch in operable communication with the reversible drive motor and the control console; a thruster tunnel comprising a first tunnel end and a second tunnel end and a tunnel opening that is configured to receive the drive shaft therein; and a thruster propeller disposed within the thruster tunnel in a plane parallel with the first tunnel end and the second tunnel end, said thruster propeller rotatable perpendicularly to the shaft; a forward thruster duct with a first forward thruster duct end and a second forward thruster duct end, said first forward thruster duct end attached to and in fluid communication with the first tunnel end; a reverse thruster duct with a first reverse thruster duct end and a second reverse thruster duct end, said first reverse thruster duct end attached to and in fluid communication with the second tunnel end; a forward thruster nozzle with a first forward thruster nozzle end and a second forward thruster nozzle end that are attached to and in fluid communication with the first forward thruster duct end and with the body of water, respectively; and a reverse thruster nozzle with a first reverse thruster nozzle end and a second reverse thruster nozzle end attached to and in fluid communication with the reverse thruster duct end and with the body of water, respectively. Further to this aspect the pair of tunnel-type thrusters each may comprise a watertight seal disposed around the tunnel opening.

In these aspects each of the tunnel-type thrusters may be disposed within a float on the amphibious aircraft, where the float comprises a pair of openings each with a diameter equal to outer diameters of the forward thruster nozzle and the reverse thruster nozzle, respectively, where the forward thruster nozzle and the reverse thruster nozzle are received therethrough. Also in these aspects each of the tunnel-type thrusters may be mounted on an inboard side of the float. Further to this each of the floats may comprise means for deploying and retracting each of the tunnel-type thrusters disposed within the float where each of the tunnel-type thrusters is mounted thereon.

In both embodiments and aspects thereof the control console may comprise a mode selector switch switchable between flight mode and taxi mode; a pair of joysticks each configured to steer the amphibious aircraft when in taxi mode; a speed sensor configured to monitor speed of the amphibious aircraft during taxiing; and an override switch electrically coupled to the speed sensor and configured to disable the mode selector switch. Further to these embodiments and aspects thereof the control console may comprise a remote control in wireless communication therewith configured to taxi the aircraft in a forward or in a reverse direction.

In another embodiment of the present invention there is provided a system for maneuvering an amphibious aircraft on a body of water comprising a propulsion system for steering the amphibious aircraft on the body of water; at least one electromagnetic lock attached to a float on the amphibious aircraft to lock and unlock with a docking ring; a control console in operable communication with the propulsion system and the electromagnetic lock; and a power source in electrical communication with the propulsion system, the electromagnetic lock and the control console.

In one aspect of this embodiment the propulsion system is a jet drive propulsion system comprising a pair or jet drives, each jet drive mounted on or in a float on the amphibious aircraft, comprising a waterproof drive motor with a shaft disposed axially therethrough; and an impeller assembly with an impeller intake port, a tunnel opening configured to receive the shaft therein, and an impeller discharge port at an axially opposing end to the tunnel opening, said impeller assembly comprising an impeller operably attached to the shaft; and an intake duct with a first intake end and a second intake end and an intake port disposed at the second intake end and in fluid communication therewith said first intake end attached to and in fluid communication with the intake opening in the impeller assembly; and a forward thruster duct with a first forward duct end and a second forward duct end; a forward thruster nozzle with a first forward nozzle end and a second forward nozzle end in fluid communication with the second forward duct end and the body of water, respectively; a reverse thruster duct with a first reverse duct end and a second reverse duct end; a reverse thruster nozzle with a first reverse nozzle end and a second reverse nozzle end in fluid communication with the second reverse duct end and the body of water, respectively; and a solenoid valve in electrical communication with the control console and in fluid communication with the discharge port and with the first forward port end and the first reverse thruster port end.

In this aspect each of the jet drives may be removably mounted onto an outer surface of the float on the amphibious aircraft. In an alternative aspect each of the jet drives may be mounted onto an inner surface of the float on the amphibious aircraft, where the float comprises a plurality of openings each with a diameter equal to outer diameters of the intake duct, the forward thruster nozzle and the reverse thruster nozzle, respectively.

In another aspect of this embodiment the propulsion system is a tunnel-type thruster propulsion system comprising a pair of tunnel-type thrusters each disposed within a float on the amphibious aircraft, comprising a reversible drive motor with a shaft disposed axially therethrough; a forward-reverse control switch in operable communication with the reversible drive motor and the control console; a thruster tunnel comprising a first tunnel end and a second tunnel end and a tunnel opening that is configured to receive the drive shaft therein; and a thruster propeller disposed within the thruster tunnel in a plane parallel with the first tunnel end and the second tunnel end, said thruster propeller rotatable in a clockwise or counterclockwise direction perpendicularly to the shaft; a forward thruster duct with a first forward thruster duct end and a second forward thruster duct end, said first forward thruster duct end attached to and in fluid communication with the first tunnel end; a reverse thruster duct with a first reverse thruster duct end and a second reverse thruster duct end, said first reverse thruster duct end attached to and in fluid communication with the second tunnel end; a forward thruster nozzle with a first forward thruster nozzle end and a second forward thruster nozzle end that are attached to and in fluid communication with the first forward thruster duct end and with the body of water, respectively; and a reverse thruster nozzle with a first reverse thruster nozzle end and a second reverse thruster nozzle end attached to and in fluid communication with the reverse thruster duct end and with the body of water, respectively.

In this aspect the float may comprise a pair of openings each with a diameter equal to outer diameters of the forward thruster nozzle and the reverse thruster nozzle, respectively, where the forward thruster nozzle and the reverse thruster nozzle are received therethrough.

In this embodiment and aspects thereof the control console comprises a mode selector switch switchable between flight mode and taxi mode; a pair of joysticks each configured to steer the amphibious aircraft when in taxi mode; a speed sensor configured to monitor speed of the amphibious aircraft during taxiing; an override switch electrically coupled to the speed sensor and configured to disable the mode selector switch; and a remote control in wireless communication with the control console, said remote control configured to taxi the aircraft in a forward or in a reverse direction or to actuate the electromechanical lock to lock and unlock with the docking ring or a combination thereof.

Provided herein is a taxiing system for steering or maneuvering an amphibious aircraft on water. The means for steering or maneuvering the taxiing system may be a jet drive-based propulsion system or a tunnel-type thruster propulsion system attached on the inboard side of each float of the amphibious aircraft.

Generally, the jet drive propulsion system comprises a pair of jet drives mounted inside each float. Any commercially available drive motor and impeller configured to deliver a thrust rate from about 25 pounds to about 75 pounds may be used for this purpose. Each jet drive may have an aerodynamic outer surface. Each jet drive comprises a waterproof drive motor attached by a shaft to an impeller that is encompassed within an impeller assembly. The impeller assembly is in fluid communication with an intake duct siphoning outside water into the impeller assembly and a solenoid valve receiving water through a discharge port to deliver jets of water to either a forward thruster nozzle or a reverse thruster nozzle to steer the amphibious aircraft in a forward or reverse direction during taxiing.

During operation of the jet drive, rotation of the impeller, enabled by the transfer of energy from the drive motor, generates a negative pressure at the impeller eye that is in proximity with the inlet port in the solenoid valve. This siphons the water from outside the aircraft into the impeller assembly. As the siphoned water flows through the vanes of the impeller, the flow path area increases resulting in a velocity decrease and consequent pressure increase in the proximity of the thruster ports in the solenoid valve. Depending on whether the forward or reverse port is electrically actuated to an open configuration by the user, the water exits the impeller assembly via the forward thruster nozzle or reverse thruster nozzle causing the aircraft to be propelled on the body of water in the forward or reverse direction respectively.

Any commercial, electrically operable solenoid valve may be utilized for this purpose. The solenoid valve may be provided with an actuating means that enables the solenoid valve to direct water either through the forward thruster nozzle or the reverse thruster nozzle as chosen by a user. Any electrically operable actuating means may be used that enables remote actuation of the solenoid valve from within the cockpit of the aircraft. For example, the actuating means is an electrically actuated plunger that is in operable communication with the control console located in the cockpit. Each jet drive is independently operable. This enables the user to maneuver the amphibious aircraft not only in the forward and reverse direction, but also to turn the aircraft on the body of water while taxiing.

Generally, the tunnel-type thruster propulsion system comprises a pair of tunnel-type thrusters each mounted inside the left and right hull of the floats on the amphibious aircraft. Each tunnel-type thruster is independently operable and enables the user to maneuver the aircraft not only in the forward and reverse direction but also to turn the aircraft on the body of water while taxiing.

Each tunnel-type thruster comprises a reversible drive motor and a thruster tunnel. Any commercially available reversible drive motor capable of delivering a thrust rate from about 25 pounds to about 75 pounds may be used for this purpose. A thruster propeller located within the thruster tunnel is operably engaged with the shaft of the drive motor using bevel gears. This enables the thruster propeller to rotate in the clockwise or counterclockwise direction about an axis that is parallel to the long axis of the thruster tunnel and perpendicular to the axis of the shaft. Depending on the direction of rotation of the thruster propeller, which is enabled by a forward-reverse control switch operated by a user via the control console, water from outside the aircraft is siphoned into the thruster tunnel through the reverse or forward thruster nozzles and accelerated outwards through the forward or reverse thruster nozzles respectively, thereby propelling the amphibious aircraft in the forward or reverse directions.

A plurality of openings are disposed through the surface of each float to receive the intake port on the intake duct in the jet drive system and the forward thruster nozzle and the reverse thruster nozzle on both systems. The openings have a diameter equal to an outer diameter of the intake duct, the forward thruster nozzle or the reverse thruster nozzle. This enables each of the three ports in fluid contact with solenoid valve to be in fluid communication with the body of water around the aircraft.

In both taxiing systems the forward and reverse thruster nozzles may have a diameter from about 2" to about 3". The intake duct at the intake port in the jet-drive system and the reverse and forward thruster nozzles in both the jet drive system and the tunnel-type thruster system may have a watertight seal that is placed between their outer circumference and the openings in the float during installation to prevent water from entering the float. Any commercially available sealing material including, but not limited to, a rubber gasket may be used for this purpose. Alternatively, the openings in the float may be welded to the outer surface of the reverse and forward thruster nozzles.

The components of the jet drive and the tunnel-type thruster may independently be made from any suitable material, including, but not limited to a metal, a metal alloy, a polymer, a polymer composite, a fiberglass, or a nano-composite material. A combination of these materials may also be used. In a non-limiting example, the various components of the tunnel-type thruster are made from aluminum.

The control console is in operable and electrical communication with the taxiing systems and a power source, for example, a direct current power source that delivers about 14 volts to about 35 volts. The control console has an enclosure with a top panel on which are assembled, a mode selector switch, a pair of joysticks and a main power switch. The mode selector switch enables a user to switch the aircraft between flight mode and taxi mode. Moving the switch to taxi mode provides power to the jet-drive system or the tunnel thruster propulsion system. Similarly, moving the switch to flight mode cuts power to the steering systems. Optionally, the control console is provided with a speed sensor configured to monitor speed of the amphibious aircraft during taxiing and to override the mode selector switch and to shut down the steering systems if the amphibious aircraft's speed exceeds a preset value. One of skill in this art is well able to determine what the safe speed limits for taxiing are and, therefore, is able to program the speed sensor to override the mode selector switch, if speeds exceed a preset value. A pair of indicator lights are in electrical communication with the mode selector switch, which helps in visual verification of flight or taxi modes and/or to generally illuminate the console for better visibility at night.

The control console has a pair of joystick controllers that operate the taxiing systems disposed in or on each float to steer the amphibious aircraft in water, similar to steering a twin-screw boat. Any commercially available joystick controller is utilizable in manufacturing the control console. The control console is configured to be in direct electrical communication with the pods (ducted propeller system) or the jet drives (jet drive propulsion system). Alternatively, the steering systems are controlled by the control console using a wireless means including, but not limited to, BLUETOOTH™, WiFi and other radio communication means.

The control console optionally has a remote control. The remote control has control buttons to move the aircraft in the forward or reverse directions for proper alignment with the dock before being manually secured thereto. A cavity or pocket or other suitable space is formed on the side of the control console enclosure for removably securing the remote control within the control console. The remote control is in wireless communication with the control console. This enables use of the remote control either from within the amphibious aircraft, or from the dock in the proximity of the aircraft. Any type of wireless communication including, but not limited to, BLUETOOTH™, WiFi and other radio communication means may be used.

The taxiing system may comprise at least one lock for securing or docking the amphibious aircraft to a mooring buoy. The lock may be an electromechanical lock that is operated from the control console or from a remote control in wireless communication with the control console. The lock is attachable to one or both floats on the amphibious aircraft and is configured to lock or unlock with a docking ring disposed, for example, on a mooring buoy. The electromechanical lock is any type of electrically actuatable lock operated using any suitable electrical actuating cable. For example, the lock may be a relay-actuated lock with a spring-forced return for closure. The electromechanical lock may be attached at any suitable location on the aircraft's exterior that enables its removable engagement with the docking ring. In a non-limiting example, the electromechanical lock is attached on the float on a front end thereof.

The docking device is configured to remotely dock an amphibious aircraft via one or more docking rings disposed on an outer surface of a mooring buoy, or on a dock or boat and the remote control configured to actuate at least one of the electromagnetic locks attached to the amphibious aircraft to lock and unlock with the docking ring. Alternatively, the docking ring is a circular docking ring circumferentially disposed around the mooring buoy. The docking rings engage the electromechanical lock, thereby securing the amphibious aircraft. The docking device may be used to secure the aircraft for deplaning or for storage or may secure the aircraft to a boat for towing. The remote control is operably configured for use from within the aircraft or from the dock or a boat in the proximity of the aircraft. The remote control is provided with control buttons to move the aircraft in the forward or reverse direction for proper alignment with the dock before being secured by actuating the electromechanical lock using a docking button on the remote control.

Also provided is a docking device for remote docking of the amphibious aircraft to a dock. The docking device generally consists of a docking ring secured to a mooring buoy and an electromagnetic lock attached to the float of the amphibious aircraft. In addition, there is provided a system for maneuvering the amphibious aircraft during taxiing and docking that integrates the various components and structural features of both the taxiing system and the docking device that facilitates taxiing the aircraft after landing on water and securing it at the dock using the docking device.

Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1A shows one configuration 100 of a control console for controlling the taxiing system. The control console comprises a mode selector switch 1 that enables a user to switch the aircraft from flight mode 2 to taxi mode 3 and vice versa. Lights 4 and 8 provide visual verification of mode status for the aircraft. The control console is also provided with a main power switch 6 and a power indicator light 5 to shut off power to the taxiing system. The control console is also provided with a pair of joystick controllers 7a and 7b that actuate the first drive motors in the left and right pods respectively to steer the aircraft in water, similar to steering a twin-screw boat.

Figure 1B:
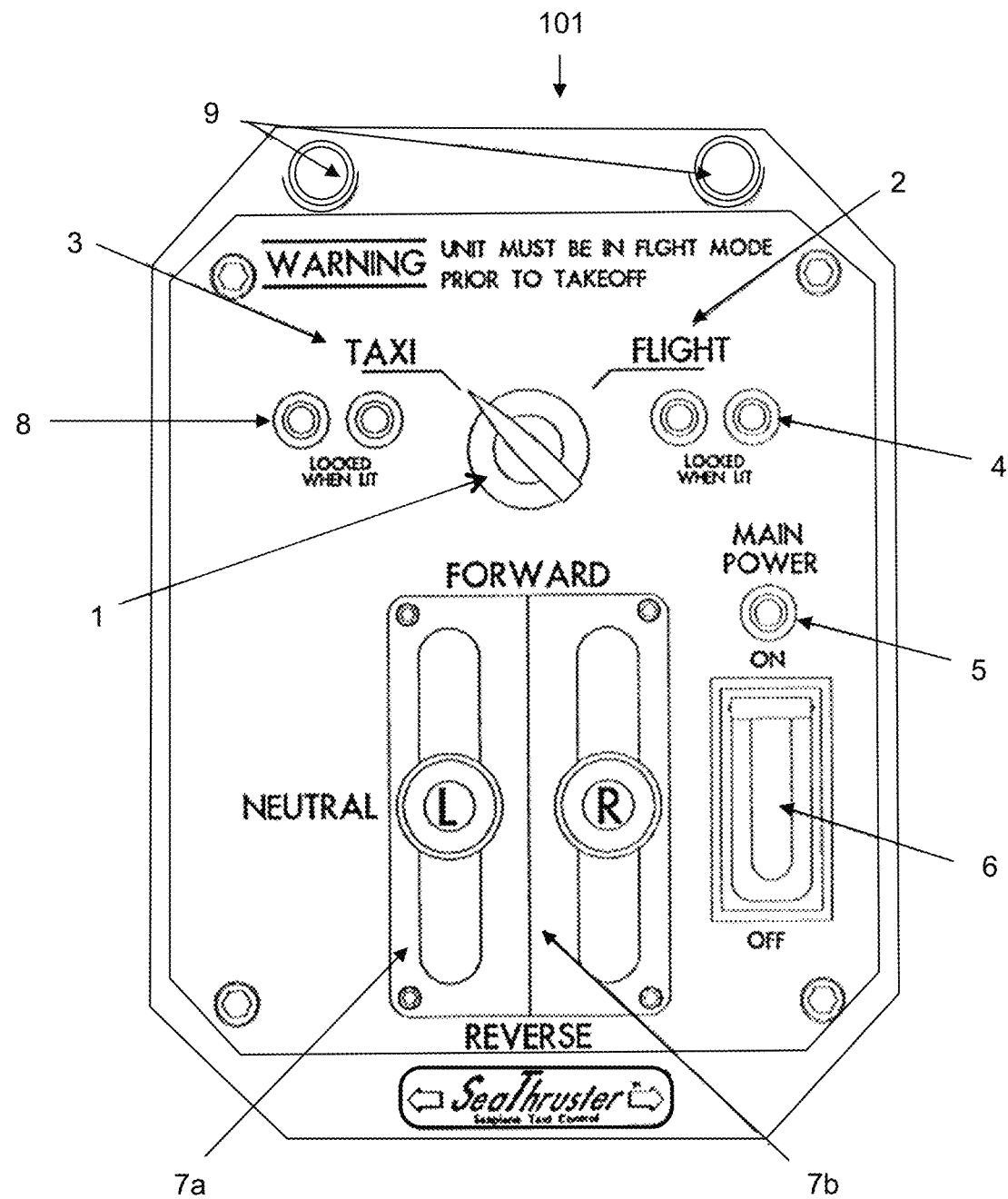
Figure 1C:
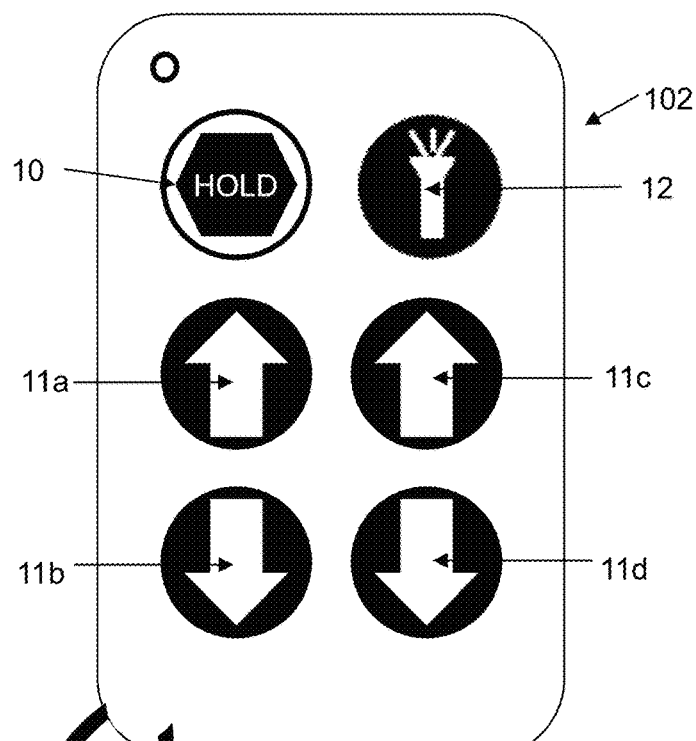
Figure 1D:
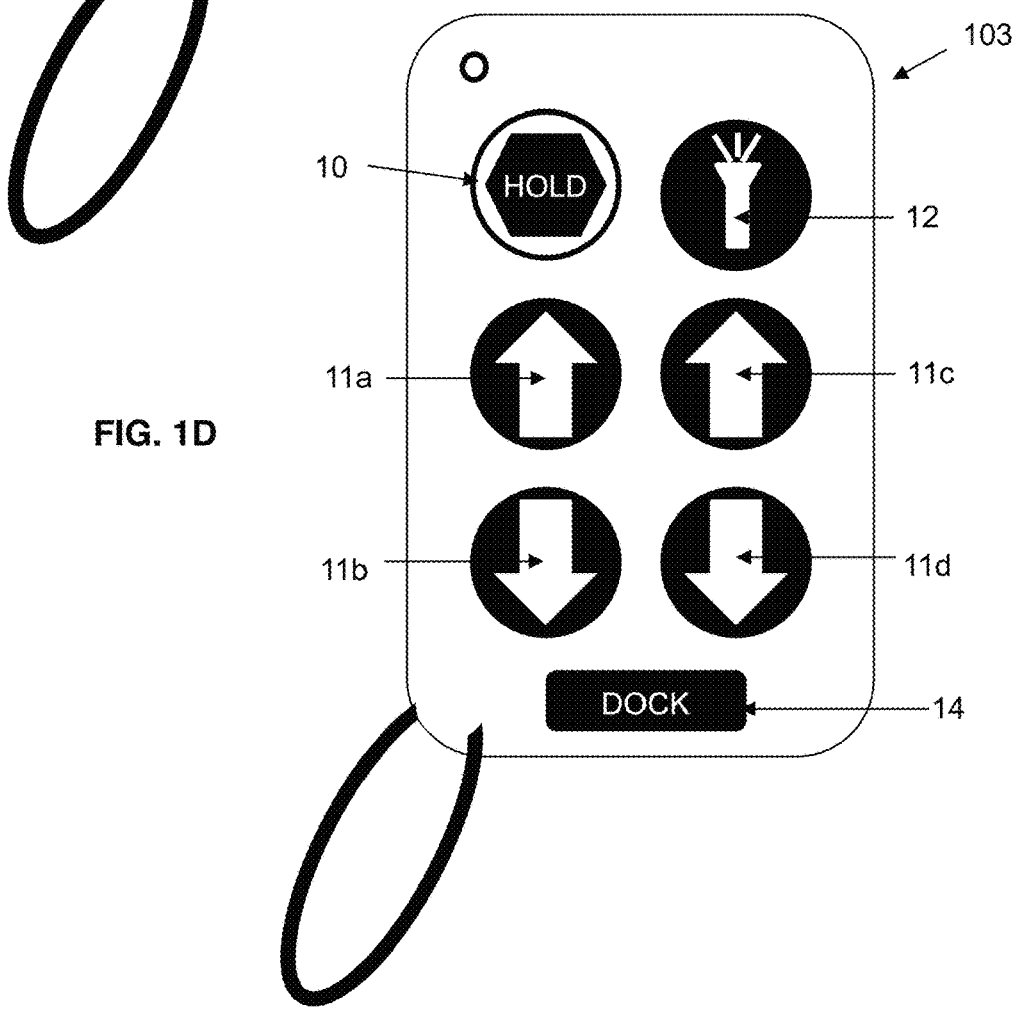
Figure 1E:
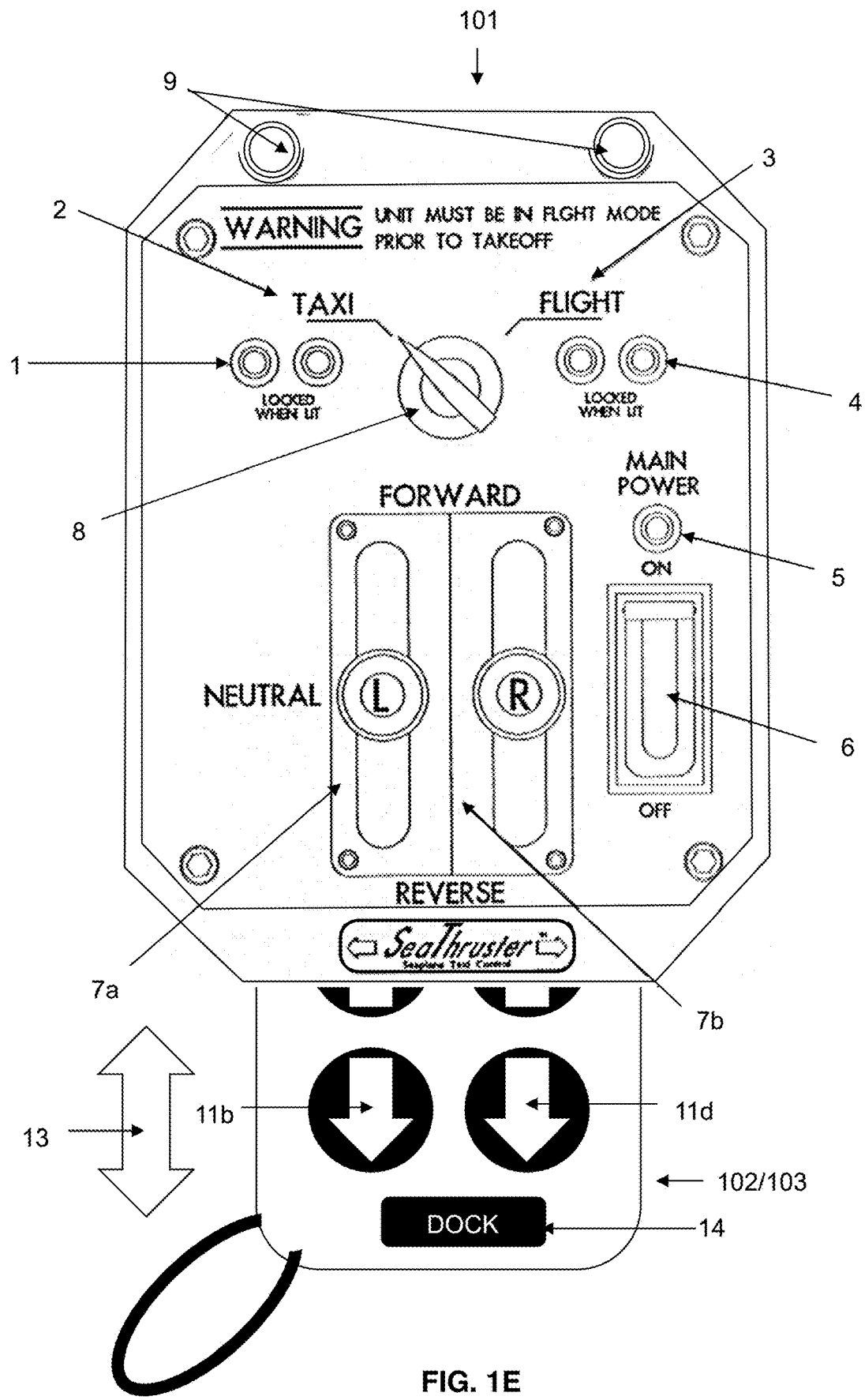

With continued reference to FIG. 1A, FIG. 1B shows a second configuration 101 of the control console that has all of the features described above and additionally has a pair of lights 9 at the top, on the control panel for better visibility at night. FIG. 1C shows one configuration 102 of the remote control with forward control buttons 11a, 11c and reverse control buttons 11b, 11d that operate the left (11a, 11b) and right (11c, 11d) thrusters. A hold button 10 enables a user to "nose" the aircraft up to a dock by bringing the thrusters to full power, allowing the user to exit the aircraft and secure the plane to a dock. Once the plane is secured, the hold is released by pressing the hold button in the remote control. A torch light button 12 provides visibility. With continued reference to FIG. 1C, FIG. 1D shows a second configuration 103 for the remote control that includes a docking button 14 that enables remote actuation of the solenoid actuated lock in the docking device to secure the aircraft to a mooring buoy (see FIG. 7A). With continued reference to FIGS. 1A-1D, FIG. 1E shows a remote control removably secured 13 within the control console.

Figure 2A:
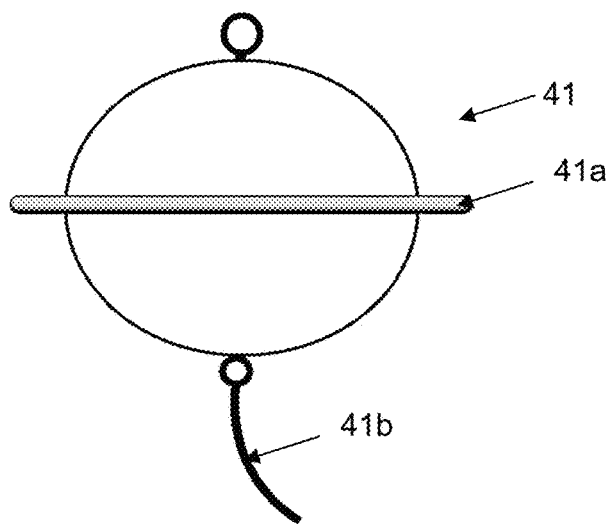
FIGS. 2A-2C shows the auto-dock mooring system for securing an amphibious aircraft to a dock.
Figure 2B:
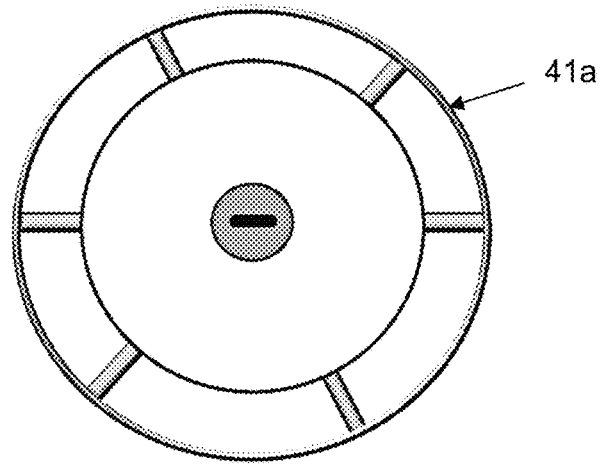
Figure 2C:
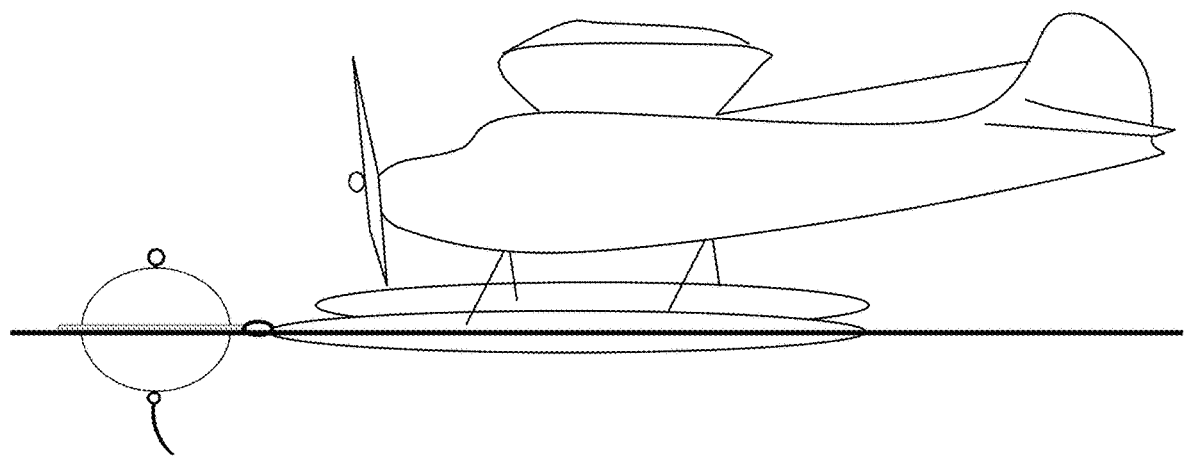

FIG. 2A is a side view of a spherical mooring buoy 41 with a mooring ring 41a disposed circumferentially and a lead 41b for securing the buoy to the dock. With continued reference to FIG. 2A, FIG. 2B is a top view of the mooring buoy showing the mooring ring disposed circumferentially. With continued reference to FIGS. 2A and 2B, FIG. 2C is a side view of a mooring buoy with a mooring ring to which is removably docked an amphibious aircraft.

Figure 3A:
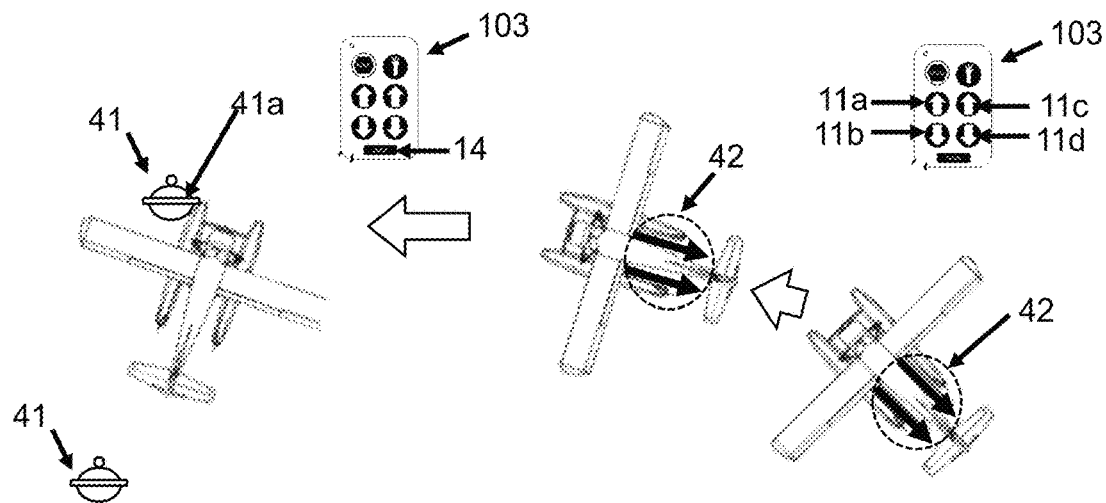
FIGS. 3A-3B illustrate steering and securing of the aircraft to a buoy and dock using the taxiing system.
Figure 3B:
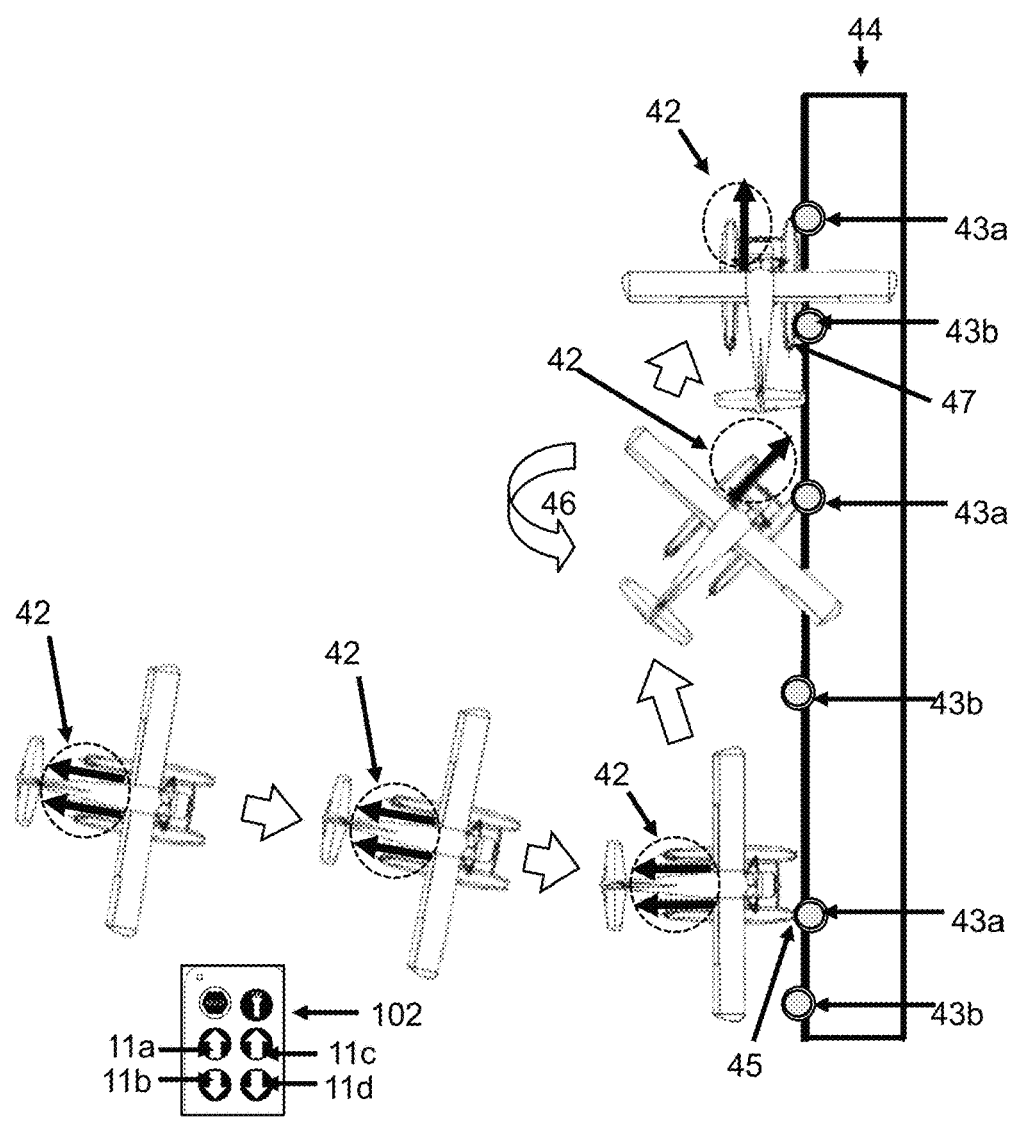

FIG. 3A illustrates how an aircraft is steered on water to approach a mooring buoy 41 by actuating 42 the thrusters using buttons 11a, 11b, 11c and 11d on remote control 103. Pressing the docking button 14 on the remote control actuates the solenoid actuated lock whereby the aircraft is secured to the mooring ring 41a. With continued reference to FIG. 3A, FIG. 3B illustrates how an aircraft is steered on water towards dock 44 by actuating 42 both thrusters using buttons 11a, 11b, 11c and 11d in the remote control 102, manually tying the bow line 45 of the aircraft to ring 43a attached to the dock, actuating 42 left thrusters to swing 46 the aircraft before manually tying the stern line 47 to ring 43b.

Figure 4:
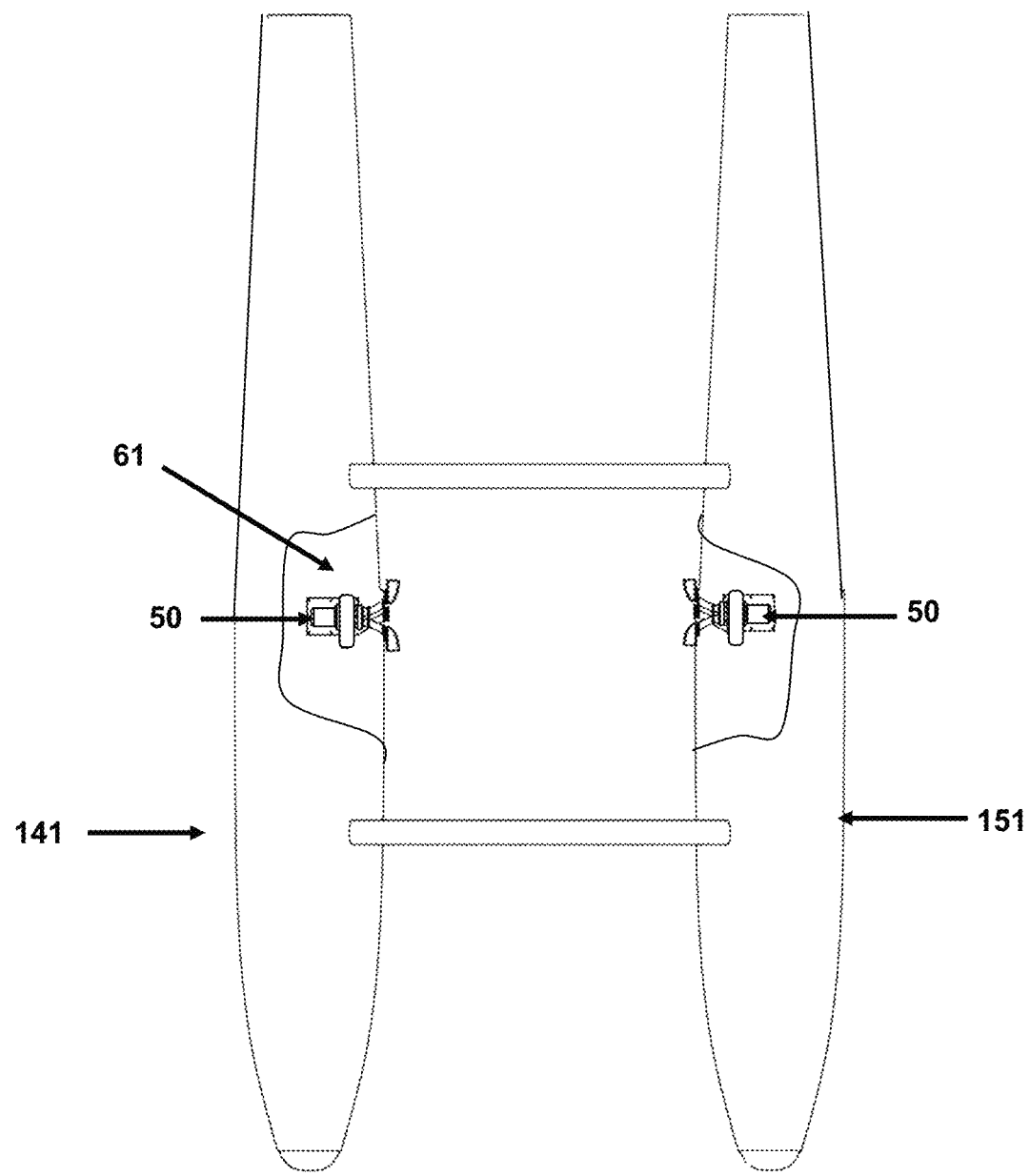
FIG. 4 shows a pair of jet drives mounted inside the hull of each float on the inboard side.

FIG. 4 is a top view of floats 141, 151 for an amphibious aircraft (not shown) with a cutaway 61 in each to show a pair of jet drives 50 utilized in the propulsion based taxiing system mounted here within.

Figure 5:
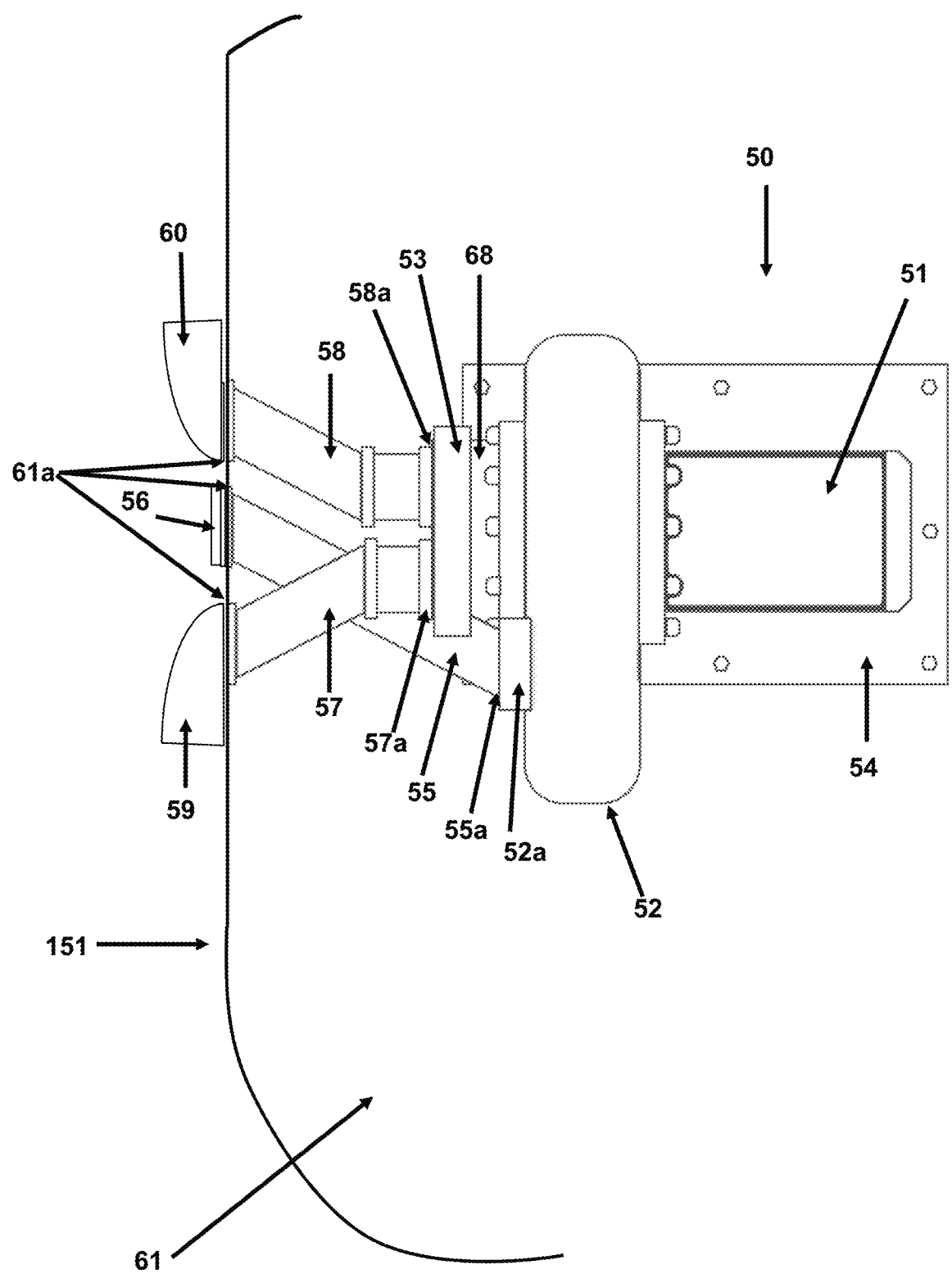
FIG. 5 shows a magnified view of the jet drive mounted inside the left float, shown in FIG. 4.

With continued reference to FIG. 4, FIG. 5 is a magnified view of the jet drive 50, shown in the cutaway 61, mounted within the left float 151. The jet drive comprises a drive motor 51 with a drive shaft 65 (see FIG. 6), an impeller assembly 52 and a solenoid valve 53, which are mounted on a support frame 54. An impeller intake port 52a is connected to and in fluid communication with the intake duct 55 at the first intake end 55a. An impeller discharge port 52c (see FIG. 6) is in fluid communication with the solenoid valve 53. The solenoid valve also is attached to and in fluid communication with the forward thruster duct 57 at the first forward duct end 57a and with the reverse thruster duct 58 at the first reverse duct end 58a.

Water from outside the float is siphoned through the intake duct into the impeller assembly via intake port 56 by the negative pressure created inside the impeller assembly by drive motor-enabled rotation of the impeller. Forward 57 and reverse 58 thruster ducts direct the pressurized water jet from the impeller discharge port 52c to outside the float through forward 59 and reverse 60 thruster nozzles to propel the amphibious aircraft over the water either in the reverse direction or the forward direction respectively. The intake port, forward thruster nozzle and reverse thruster nozzle are fitted respectively to the intake duct, forward thruster duct and reverse thruster duct through float openings 61a on the float. Each float opening may have a watertight seal disposed between the ducts and the openings.

Figure 6:
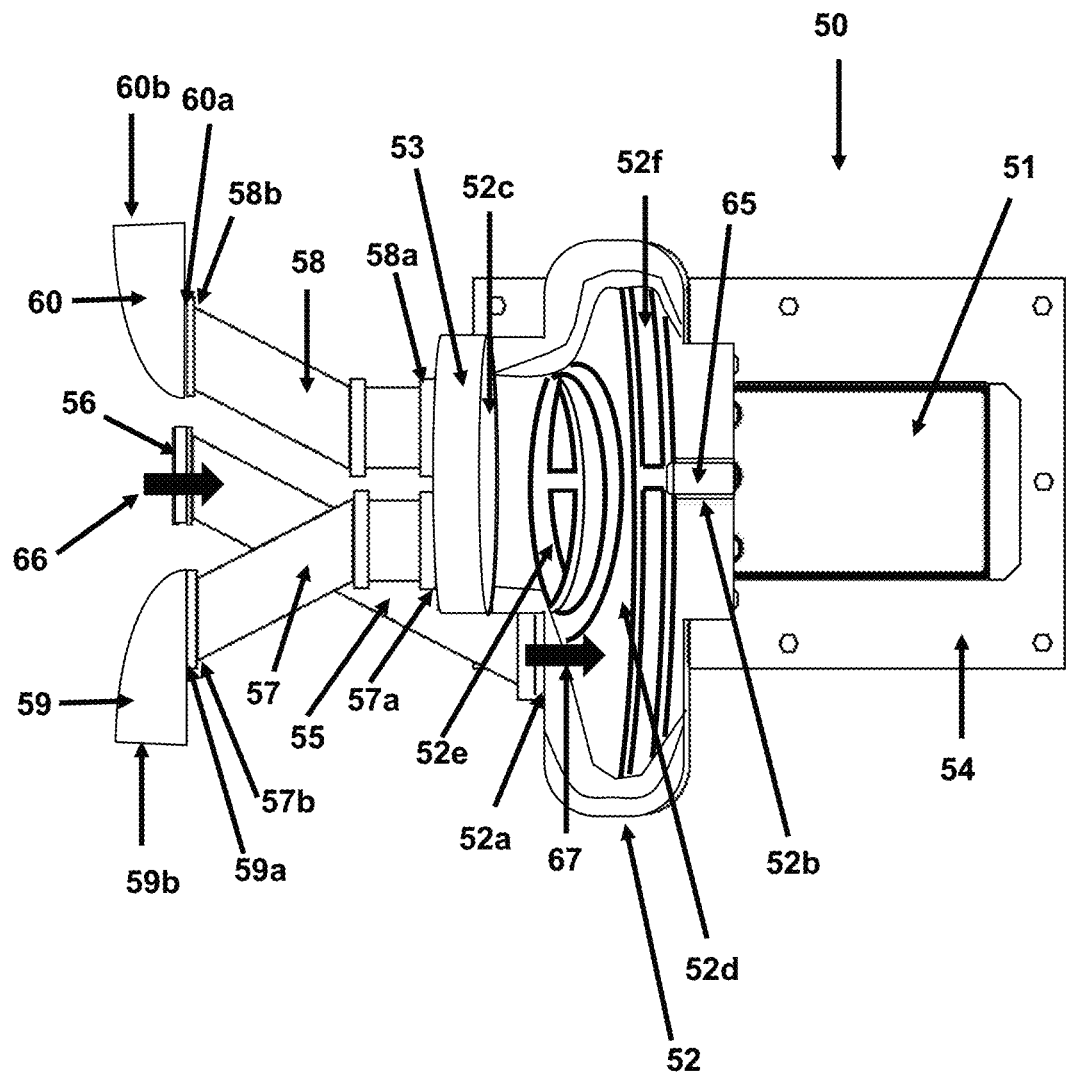
FIG. 6 shows a cross sectional view of the jet drive shown in FIG. 5.

With continued reference to FIG. 5, FIG. 6 shows the jet drive propulsion system with the impeller assembly in cross-section. The impeller assembly 52 has an impeller intake port 52a, a tunnel opening 52b configured to receive the drive shaft 65 and a discharge opening 52c at an axially opposing end to the tunnel opening. An impeller 52d comprising an impeller eye 52e and vanes 52f is attached to the drive shaft within the impeller assembly. Discharge port 52c in the impeller assembly is in fluid communication with solenoid valve 53. Forward thruster duct 57 with first forward duct end 57a and second forward duct end 57b and reverse thruster duct 58 with first reverse duct end 58a and second reverse duct end 58b are attached to and fluidly communicate with the solenoid at the first forward and reverse duct ends. Forward thruster nozzle 59 with a first forward nozzle end 59a is in fluid communication with the second forward duct end and a second forward nozzle end 59b open to the body of water. Correspondingly, reverse thruster nozzle 60 with a first reverse nozzle end 60a is in fluid communication with the second reverse duct end and a second reverse nozzle end 59b is open to the body of water.

Rotation of the impeller enabled by the drive motor generates a negative pressure at the impeller eye that is in proximity to the intake duct 55 at the first intake end 55a thereof. This siphons the water from outside the amphibious aircraft at 66 into the impeller assembly at 67 via the intake port 56 at the second intake end 55b of the intake duct and through the intake duct. As the siphoned water flows through the vanes of the impeller, the flow path area increases resulting in a velocity decrease and consequent pressure increase in the solenoid valve in the proximity of the forward and reverse thruster ducts. Depending on whether the forward 59 or reverse 60 thruster nozzle is electrically actuated to an open configuration by the user, the water exits the impeller assembly via the forward or reverse thruster duct through to forward or reverse thruster nozzle to provide forward or reverse propulsion to the aircraft.

Figure 7:
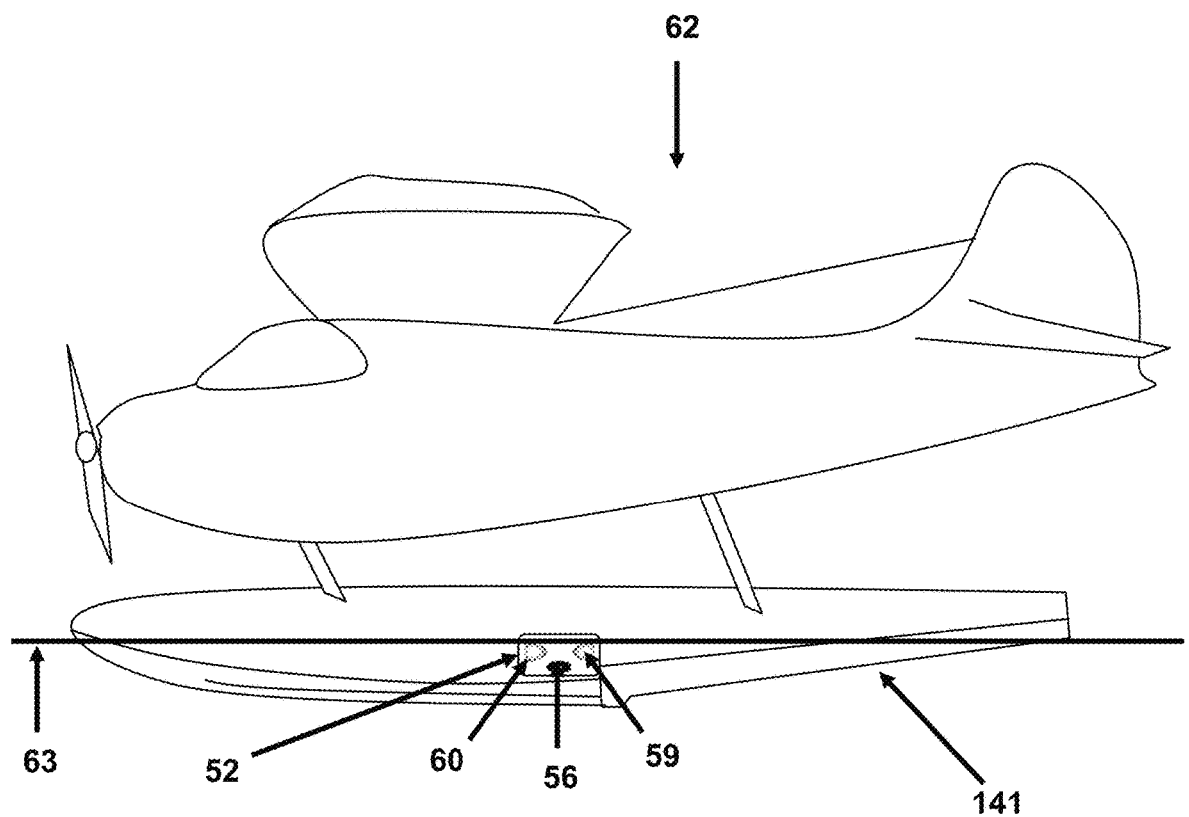
FIG. 7 shows a side view of the jet drive mounted inside the right float, of an amphibious aircraft.

With continued reference to FIG. 4, FIG. 7 is a side view of the jet drive mounted inside the right float 141 of an amphibious aircraft 62. Intake port 56, and the forward 59 and reverse 60 thruster nozzles are positioned in the float to be immersed just below the water level 63, which allows for continuous siphoning of water into impeller assembly 52 and exit of a jet of pressurized water from the impeller assembly to the outside through forward 59 or reverse 60 thruster nozzles by actuation of the solenoid valve by the user.

Figure 8:
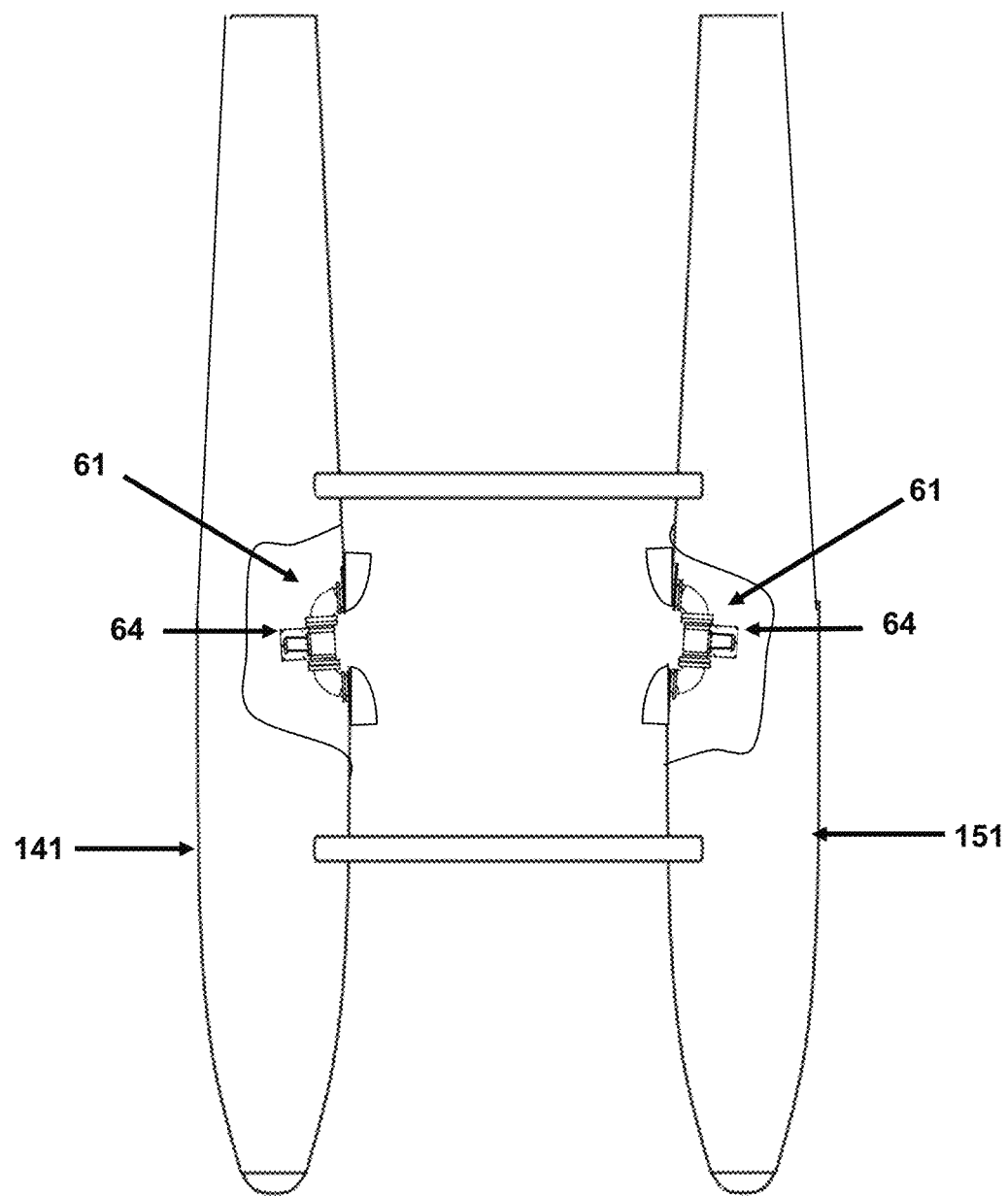
FIG. 8 shows a pair of tunnel-type thrusters mounted inside the hull of each float on the inboard side.

FIG. 8 is a top view of floats 141, 151 for an amphibious aircraft (not shown) with a cut away 61 in each to show a pair of tunnel-type thrusters 64 utilized in the tunnel-type thruster propulsion based taxiing system mounted therein.

Figure 9:
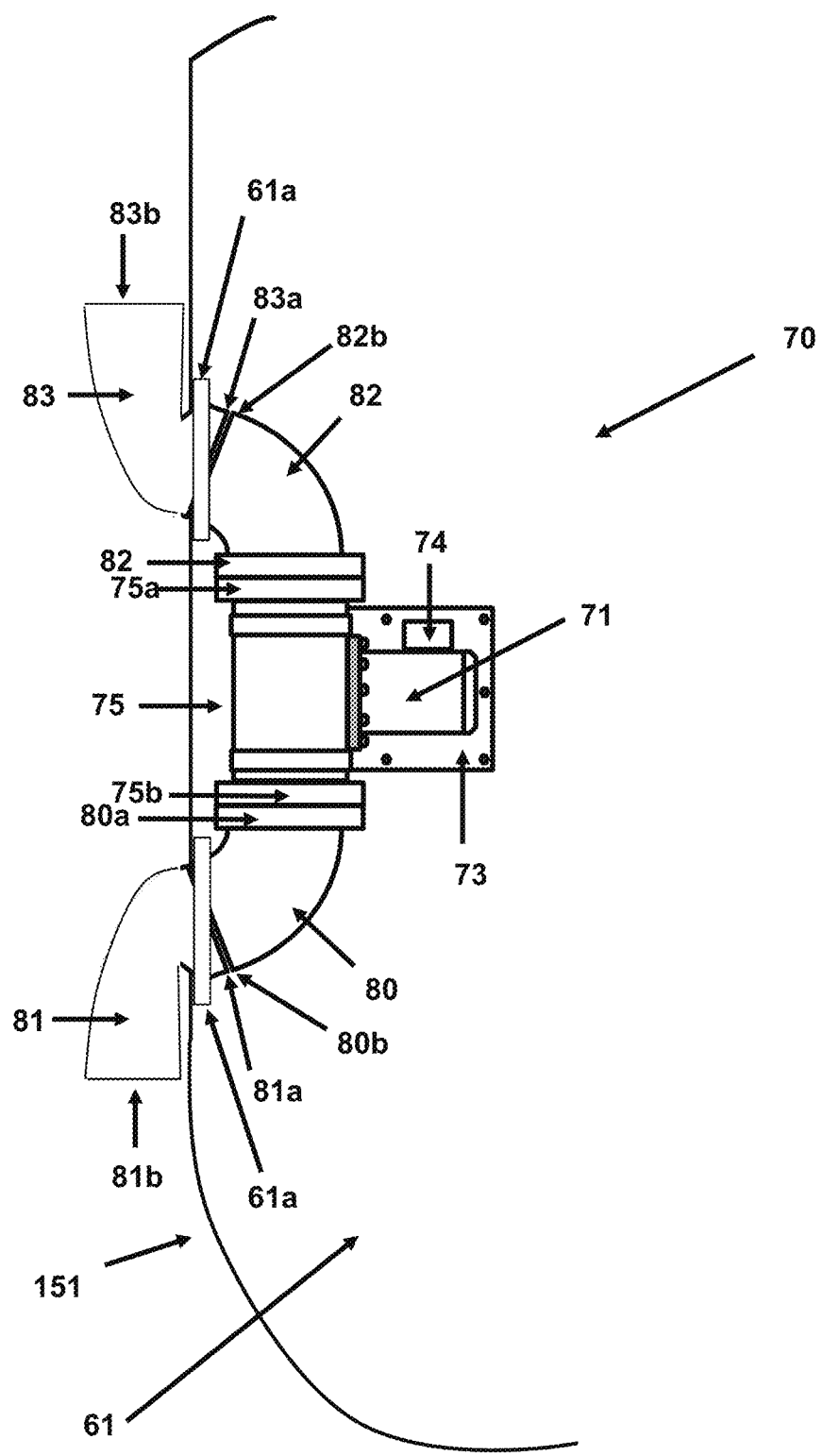
FIG. 9 shows a magnified view of the tunnel-type thruster mounted inside the left float, shown in FIG. 8.

With continued reference to FIG. 8, FIG. 9 is a magnified view of the propulsion system showing the tunnel-type thruster 70 through cutaway 61 mounted inside the left float 151. The tunnel-type thruster 70 comprises a reversible drive motor 71 mounted on a base plate 73, a forward-reverse control switch 74 in operable communication with the drive motor and the control console and a thruster tunnel 75 with a first tunnel end 75a, a second tunnel end 75b and a tunnel opening 75c (see FIG. 10B) formed through the tunnel surface between the first tunnel end and the second tunnel end. The tunnel opening has an inner diameter equal to the outer diameter of the shaft 72 (see FIGS. 10A-10B) on the drive motor, so that the drive shaft is received through the tunnel opening into the thruster tunnel. Within the thruster tunnel, the drive shaft is in operable communication with a thruster propeller 77 (see FIG. 10B) disposed in a plane parallel with the first tunnel end and the second tunnel end, along an axis perpendicular to the shaft.

A forward thruster duct 80 is attached at a first forward thruster duct end 80a to the first tunnel end in the thruster tunnel and is attached at a second forward thruster duct end 80b to a first forward thruster nozzle end 81a of a forward thruster nozzle 81. The second forward thruster nozzle end 81b is open to the body of water. The forward thruster nozzle passes through one of the openings 61a on the float. A reverse thruster duct 82 is attached at a first reverse thruster duct end 82a to the second tunnel end in the thruster tunnel and is attached at a second reverse thruster duct end 82b to a first reverse thruster nozzle end 83a of a reverse thruster nozzle 83. The second reverse thruster nozzle end 83b is open to the body of water. The reverse thruster nozzle passes through another of the openings 61a provided on the float.

During operation, user-enabled rotation of the thruster propeller in the clockwise or forward or counterclockwise or reverse or backwards direction enables siphoning of water from outside the amphibious aircraft into the thruster tunnel via either the second reverse thruster nozzle end 83b in the reverse thruster nozzle or the second forward thruster nozzle end 81b in the forward thruster nozzle. The siphoned water is then accelerated outwards through the forward thruster nozzle 81 or reverse thruster nozzle 83 thereby propelling the amphibious aircraft in the forward or reverse directions, respectively.

Figure 10A:
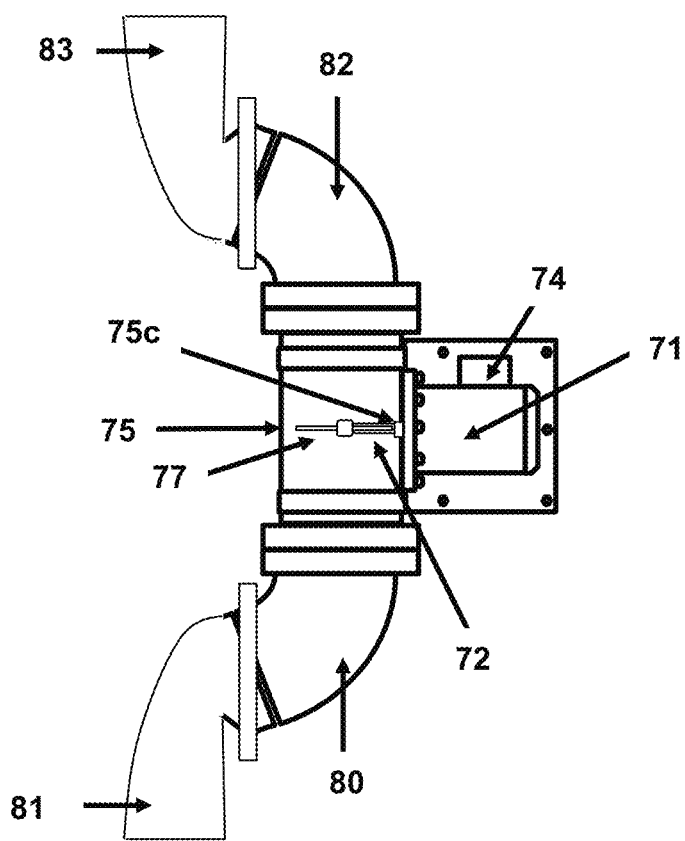
FIGS. 10A-10B show cross sectional views of the thruster tunnel of the tunnel-type thruster shown in FIG. 9.

With continued reference to FIG. 9, FIG. 10A is a cross sectional top view of the thruster tunnel 75 showing the shaft 72 of the drive motor 71 received into the thruster tunnel through the tunnel opening 75c. A watertight seal 75d is disposed around the tunnel opening (see FIG. 10B). Thruster propeller 77 is disposed perpendicular to and in operable communication with the shaft. Rotation of the shaft in a clockwise (forward) or counterclockwise (reverse) direction, enabled by the forward-reverse control switch 74 enables actuation of the thruster propeller to rotate in a clockwise or counterclockwise direction around the rotation axis 77a (see FIG. 10B).

Figure 10B:
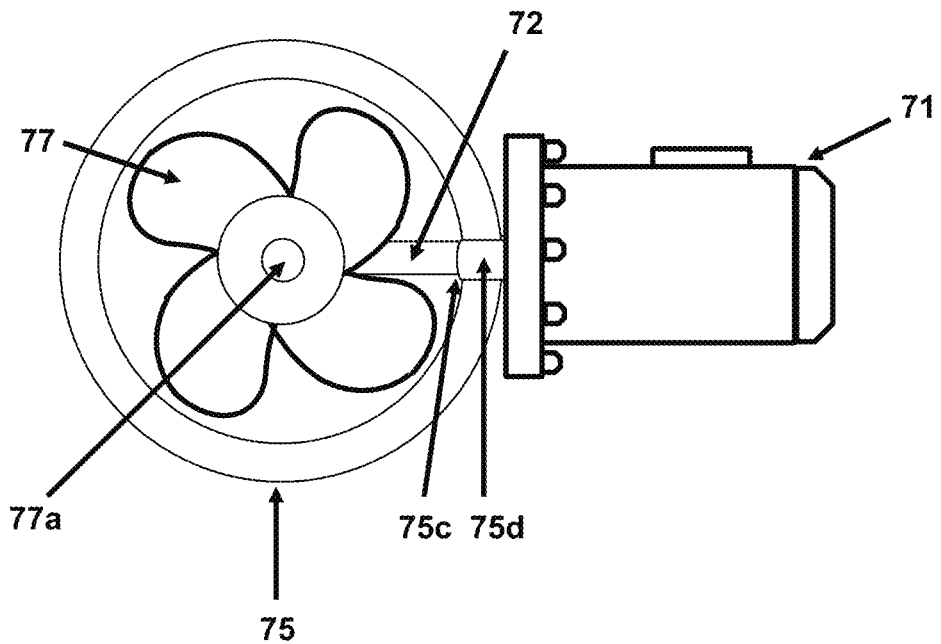

With continued reference to FIGS. 9 and 10A, FIG. 10B shows a cross sectional front side view of the thruster tunnel 67 showing the tunnel opening 67c and the watertight seal 67d through which drive shaft 68 is received and oriented perpendicularly to the rotation axis 69a of the thruster propeller 69.

Figure 11:
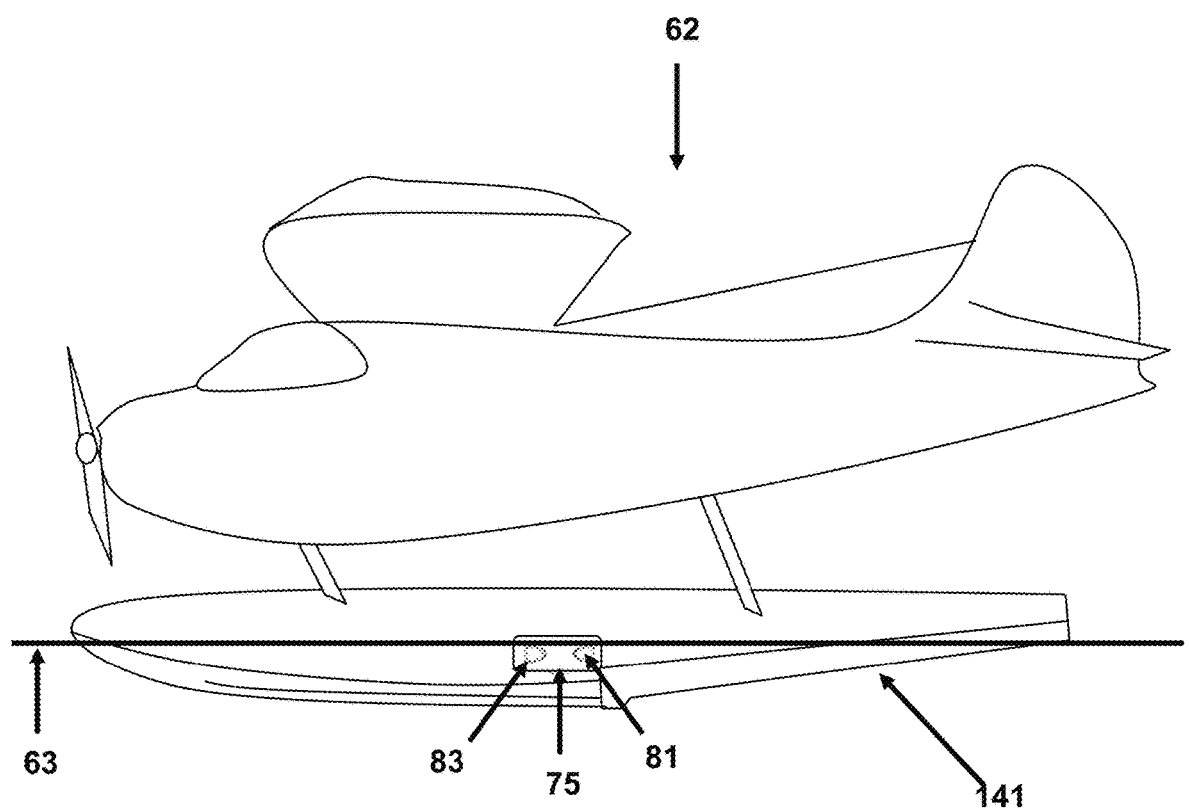
FIG. 11 shows a side view of the tunnel-type thruster mounted inside the right float, of an amphibious aircraft.

With continued reference to FIG. 8, FIG. 11 is a side view of the tunnel-type thruster mounted inside the right float 141, of an amphibious aircraft 62. The forward thruster nozzle 80 and the reverse thruster nozzle 82 are positioned on the float to be immersed just below the waterline 63. This enables continuous siphoning of water into thruster tunnel 75 and continuous exit of a jet of pressurized water to the outside to steer the amphibious aircraft in a forward or reverse direction.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below.

What is claimed is:

1. A taxiing system for steering an amphibious aircraft on a body of water comprising:
    a tunnel-type thruster propulsion system, comprising:
        a pair of tunnel-type thrusters each comprising:
            a reversible drive motor with a shaft disposed axially therethrough;
            a forward-reverse control switch in operable communication with the reversible drive motor and the control console;
            a thruster tunnel comprising a first tunnel end and a second tunnel end and a tunnel opening that is configured to receive the drive shaft therein; and
            a thruster propeller disposed within the thruster tunnel in a plane parallel with the first tunnel end and the second tunnel end, said thruster propeller rotatable perpendicularly to the shaft;

a forward thruster duct with a first forward thruster duct end and a second forward thruster duct end, said first forward thruster duct end attached to and in fluid communication with the first tunnel end;

a reverse thruster duct with a first reverse thruster duct end and a second reverse thruster duct end, said first reverse thruster duct end attached to and in fluid communication with the second tunnel end;

a forward thruster nozzle with a first forward thruster nozzle end and a second forward thruster nozzle end that are attached to and in fluid communication with the first forward thruster duct end and with the body of water, respectively; and a reverse thruster nozzle with a first reverse thruster nozzle end and a second reverse thruster nozzle end attached to and in fluid communication with the reverse thruster duct end and with the body of water, respectively;

a control console in operable communication with the tunnel-type thruster propulsion system; and a power source in electrical communication with the tunnel-type thruster propulsion system and the control console.

2. The taxiing system of claim 1, further comprising a watertight seal disposed around the tunnel opening.

3. A system for maneuvering an amphibious aircraft on a body of water comprising:

a propulsion system, comprising a pair of tunnel-type thrusters each disposed within a float on the amphibious aircraft, comprising:

a reversible drive motor with a shaft disposed axially therethrough;

a forward-reverse control switch in operable communication with the reversible drive motor and the control console;

a thruster tunnel comprising a first tunnel end and a second tunnel end and a tunnel opening that is configured to receive the drive shaft therein and has a watertight seal disposed therearound; and a thruster propeller disposed within the thruster tunnel in a plane parallel with the first tunnel end and the second tunnel end, said thruster propeller rotatable in a clockwise or counterclockwise direction perpendicularly to the shaft;

a forward thruster duct with a first forward thruster duct end and a second forward thruster duct end, said first forward thruster duct end attached to and in fluid communication with the first tunnel end;

a reverse thruster duct with a first reverse thruster duct end and a second reverse thruster duct end, said first reverse thruster duct end attached to and in fluid communication with the second tunnel end;

a forward thruster nozzle with a first forward thruster nozzle end and a second forward thruster nozzle end that are attached to and in fluid communication with the first forward thruster duct end and with the body of water, respectively; and a reverse thruster nozzle with a first reverse thruster nozzle end and a second reverse thruster nozzle end attached to and in fluid communication with the reverse thruster duct end and with the body of water, respectively;

a control console in operable communication with the propulsion system;

a power source in electrical communication with the propulsion system and the control console.

* * * * *